(12) United States Patent
Ko et al.

(10) Patent No.: US 8,712,341 B2
(45) Date of Patent: Apr. 29, 2014

(54) METHOD AND APPARATUS FOR TRANSMITTING AND RECEIVING A SIGNAL IN A COMMUNICATION SYSTEM

(75) Inventors: Young Chai Ko, Seoul (KR); Hae Woon Nam, Austin, TX (US); Seung Sik Eom, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 805 days.

(21) Appl. No.: 12/525,290

(22) PCT Filed: Jan. 18, 2008

(86) PCT No.: PCT/KR2008/000328
§ 371 (c)(1),
(2), (4) Date: Jul. 30, 2009

(87) PCT Pub. No.: WO2008/093948
PCT Pub. Date: Aug. 7, 2008

(65) Prior Publication Data
US 2010/0075617 A1    Mar. 25, 2010

(30) Foreign Application Priority Data

Jan. 30, 2007   (KR) .................. 10-2007-0009533

(51) Int. Cl.
*H04B 1/44* (2006.01)
(52) U.S. Cl.
USPC ................. 455/78; 455/88; 455/101; 455/103
(58) Field of Classification Search
CPC ............. H04B 17/0007; H04B 17/003; H04B 17/0062; H04B 2215/00; H04B 7/10
See application file for complete search history.

(56) References Cited

U.S. PATENT DOCUMENTS

| | | | |
|---|---|---|---|
| 6,542,736 B1 * | 4/2003 | Parkvall et al. | 455/452.2 |
| 6,799,059 B1 * | 9/2004 | Austin et al. | 455/561 |
| 6,862,271 B2 * | 3/2005 | Medvedev et al. | 370/329 |
| 6,922,445 B1 * | 7/2005 | Sampath et al. | 375/267 |
| 7,499,709 B2 * | 3/2009 | Das et al. | 455/455 |
| 7,769,390 B2 * | 8/2010 | Kim et al. | 455/452.2 |
| 7,800,552 B2 * | 9/2010 | Nakaya et al. | 343/876 |
| 2002/0114379 A1 * | 8/2002 | Uesugi et al. | 375/219 |
| 2005/0135497 A1 | 6/2005 | Kim et al. | |
| 2005/0192019 A1 | 9/2005 | Kim et al. | |
| 2008/0132168 A1 * | 6/2008 | Segev et al. | 455/41.2 |
| 2009/0231992 A1 * | 9/2009 | Kim et al. | 370/210 |

FOREIGN PATENT DOCUMENTS

| | | |
|---|---|---|
| JP | 09-219675 A | 8/1997 |
| JP | 2001-333051 A | 11/2001 |
| JP | 2002-026796 A | 1/2002 |
| KR | 19990086133 | 12/1999 |
| KR | 20050080369 A | 8/2005 |
| WO | WO-00/11876 | 3/2000 |
| WO | WO-2005/069505 A1 | 7/2005 |
| WO | WO-2006-106613 A1 | 10/2006 |
| WO | WO 2007136289 A1 * | 11/2007 |

* cited by examiner

*Primary Examiner* — Fayyaz Alam
*Assistant Examiner* — Mohammed Rachedine
(74) *Attorney, Agent, or Firm* — Rabin & Berdo, P.C.

(57) ABSTRACT

A method and an apparatus for transmitting and receiving a signal in a communication system are provided. The method includes transmitting a signal to a receiver through one of the antennas, receiving an antenna switching indicator indicating to switch the transmitting antenna from the receiver, and switching the transmitting antenna according to the antenna switching indicator, and transmitting a signal to the receiver through a switched antenna.

17 Claims, 4 Drawing Sheets

METHOD AND APPARATUS FOR TRANSMITTING AND RECEIVING A SIGNAL IN A COMMUNICATION SYSTEM

TECHNICAL FIELD

The present invention relates to a method and an apparatus for transmitting and receiving a signal in a communication system, and more particularly, to a method and apparatus for selecting a path of a transmitting antenna, applying an adaptive modulation scheme according to the selected path, and transmitting and receiving a signal in a communication system in which a transmitter has a plurality of transmitting antennas.

BACKGROUND ART

Current mobile communication systems are developing into next-generation mobile communication systems for providing service capable of transmitting and receiving a large amount of data at a high speed. In the wireless channel environment of mobile communication systems, as opposed to the wired channel environment, errors occur due to various causes, such as multipath interference, shadowing, attenuation of electric waves, time-varying noise, interference and fading, etc., which results in data loss. In addition, the available frequency band of a wireless channel is limited.

Therefore, next-generation mobile communication systems must use limited frequency band and power resources for the sake of a high transmission rate and reliable transmission in a channel of a varying environment. Adaptive modulation and antenna diversity are the most important factors allowing such technology. The adaptive modulation scheme can improve frequency efficiency in a wireless channel environment. To use a varying channel while maintaining an instantaneous error rate below a reference value, the adaptive modulation scheme adaptively applies a modulation scheme by adjusting a modulation parameter such as a constellation size and a coding rate. In general, a modulation mode is selected based on a comparison result between some previously determined reference values and received signal intensity. In other words, a transmitter receives state information of a transceiver channel fed back from a receiver. Here, when the channel state is good, the transmitter may use a modulation scheme having a high transmission rate to transmit a signal. On the other hand, when the channel state is not good, the transmitter may use a modulation scheme having a low transmission rate to reduce an error rate.

Meanwhile, diversity techniques are being used to remove instability of communication due to fading. According to an antenna diversity scheme among the diversity techniques, a transceiver has a plurality of antennas to transmit and receive a signal using an antenna having a good channel or through multiple paths. When there are a plurality of receiving antennas, the optimum antenna combining method used as an antenna diversity scheme is the well-known Maximum Ratio Combining (MRC).

In general, receivers may be user terminals, and it may be difficult for the receivers to have multiple antennas. In addition, diversity combining schemes have only been researched separately from the adaptive modulation scheme and never been considered in association with the adaptive modulation scheme. But today, to efficiently use limited resources of wireless channels and improve reliability, it is necessary for a transmitting end to combine a diversity scheme using multiple antennas with the adaptive modulation scheme.

DISCLOSURE OF INVENTION

Technical Problem

The present invention is directed to a method and apparatus for transmitting and receiving a signal in a communication system which combine an adaptive modulation scheme with a multiple-antenna diversity scheme of a transmitter and thus can efficiently transmit data while ensuring reliability.

The present invention is also directed to a method and apparatus for transmitting and receiving a signal in a communication system in which a transmitter including a plurality of antennas can switch an antenna through feedback and transmit a signal when a Signal-to-Noise Ratio (SNR) of a signal received at a receiver is less than a reference value.

Technical Solution

One aspect of the present invention provides a method of transmitting and receiving a signal at a transmitter including a plurality of antennas, the method including: transmitting a signal to a receiver through one of the antennas; receiving an antenna switching indicator indicating to switch the transmitting antenna from the receiver; and switching the transmitting antenna according to the antenna switching indicator, and transmitting a signal to the receiver through a switched antenna.

The antennas may have different directivities from one another. The receiver may measure a Signal-to-Noise Ratio (SNR) of the received signal, and then feed back the antenna switching indicator to the transmitter when the SNR is less than a reference value.

The method may further include receiving a modulation mode index from the receiver, and the transmitter may modulate a subsequent signal according to a modulation mode corresponding to the modulation mode index and transmit the modulated signal. In addition, the receiver may compare an SNR of the received signal with a threshold value $\gamma_{T_n}$ (n=N, N−1, ..., 2) for determining a modulation mode, and determine n as the modulation mode when the SNR is less than $\gamma_{T_{n+1}}$ and greater than or equal to $\gamma_{T_n}$.

The method may further include transmitting multi-transmitter-antenna mode information indicating that the signal is transmitted through the multiple transmitting antennas to the receiver. In addition, the multi-transmitter-antenna mode information may include at least one of information on a number of the antennas and a reference value. Furthermore, when the receiver continuously feeds back as many antenna switching indicators as the number of the antennas to the transmitter, the receiver may feed back information on an antenna having the highest SNR among the antennas to the transmitter, and the transmitter may transmit the signal through the antenna having the highest SNR.

Another aspect of the present invention provides a method of transmitting and receiving a signal at a receiver connected with a transmitter including a plurality of transmitting antennas through a wireless channel, the method including: receiving a signal from the transmitter through one of the transmitting antennas; measuring a Signal-to-Noise Ratio (SNR) of the received signal; comparing the measured SNR with a reference value; and transmitting to the transmitter an antenna switching indicator indicating to switch the transmitting antenna when the measured SNR is less than the reference value as a result of the comparison.

The method may further include: determining a modulation mode corresponding to the measured SNR; and transmitting a modulation mode index according to the determined modulation mode to the transmitter, and the receiver may compare the measured SNR with a threshold value $\gamma_{T_n}$ (n=N, N−1, . . . , 2) for determining a modulation mode and determine n as the modulation mode when the SNR is less than $\gamma_{T_{n+1}}$ and greater than or equal to $\gamma_{T_n}$.

The method may further include receiving multi-transmitter-antenna mode information indicating that the signal is transmitted through the multiple transmitting antennas from the transmitter. In addition, the multi-transmitter-antenna mode information may include at least one of information on a number of the antennas and the reference value. Furthermore, when the receiver continuously feeds back as many antenna switching indicators as the number of the antennas to the transmitter, and SNRs of all the antennas of the transmitter are less than the reference value, the receiver may feed back information on an antenna having the highest SNR among the antennas of the transmitter to the transmitter.

In addition, when the receiver continuously transmits many antenna switching indicators as the number of the antennas to the transmitter, and all SNRs of the transmitting antennas are less than a threshold value $\gamma_{T2}$, the receiver may request the transmitter to transmit a signal using a Quadrature Phase Shift Keying (QPSK) modulation scheme. In addition, when the receiver continuously transmits as many antenna switching indicators as the number of the antennas to the transmitter, and all SNRs of the transmitting antennas are less than a threshold value $\gamma_{T2}$, the receiver may transmit to the transmitter a request to store data in a buffer and wait for a next guard period.

Still another aspect of the present invention provides an apparatus for transmitting and receiving a signal, including: a transmitter including a plurality of transmitting antennas, modulating a signal according to a modulation mode fed back from a receiver, transmitting the modulated signal, and switching a transmitting antenna according to an antenna switching indicator received from the receiver; and the receiver feeding back the antenna switching indicator to the transmitter when a Signal-to-Noise Ratio (SNR) of the signal transmitted from the transmitter is less than a reference value.

The receiver may determine the modulation mode corresponding to the SNR of the signal transmitted from the transmitter and feed back the modulation mode to the transmitter. The transmitter may include: a modulator for modulating the transmission signal according to the modulation mode fed back from the receiver; and a switching controller for controlling switching of the transmitting antenna according to the antenna switching indicator fed back from the receiver. The receiver may include: an SNR measurer for measuring SNRs of the respective antennas with respect to the received signal; a switching determiner for comparing the measured SNR with the reference value and determining whether to switch the transmitting antenna of the transmitter or not; and a modulation mode determiner for determining the modulation mode using the measured SNR. The receiver may feed back as many antenna switching indicators as a number of the antennas of the transmitter, and feed back information on an antenna having the highest SNR among the antennas of the transmitter to the transmitter when SNRs of all the antennas of the transmitter are less than the reference value.

Advantageous Effects

According to the present invention, an adaptive modulation scheme is combined with a multi-transmitter-antenna diversity scheme, and thus it is possible to provide a method and an apparatus for transmitting and receiving a signal in a communication system which can efficiently transmit data while ensuring reliability.

According to the present invention, multiple antennas of a transmitting end have different directivities, the whole directional antennas look like an omni directional antenna. However, the present invention actually switches to a directional antenna having the optimum directivity with respect to a user and uses it, thereby obtaining the optimum antenna gain. The present invention can be optimally used in a Wireless Personal Area Network (WPAN) system based on oncoming Millimeter (MM) waves.

| * Description of Major Symbols in the above Figures | |
|---|---|
| 101: Transmitter | 105: Receiver |
| 201: Modulator | 203: Switching controller |
| 301: SNR measurer | 305: Switching determiner |
| 307: Modulation mode determiner | |

BEST MODE FOR CARRYING OUT THE INVENTION

Hereinafter, an exemplary embodiment of the present invention will be described in detail with reference to the accompanying drawings. However, the present invention is not limited to the exemplary embodiment disclosed below, but can be implemented in various types. Therefore, the present exemplary embodiment is provided for complete disclosure of the present invention and to fully inform the scope of the present invention to those ordinarily skilled in the art.

Figure 1:
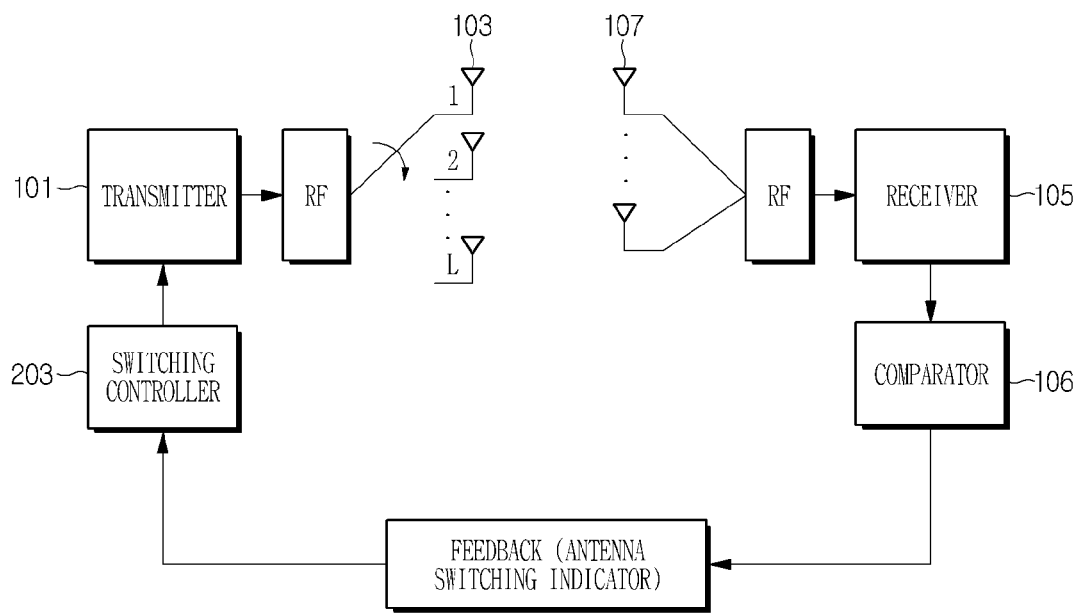
FIG. 1 is a block diagram of an apparatus for transmitting and receiving a signal according to an exemplary embodiment of the present invention.
Figure 2:
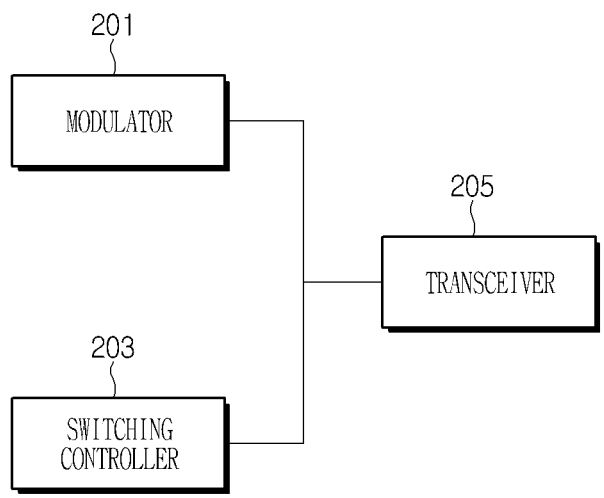
FIG. 2 is a block diagram of a transmitter according to an exemplary embodiment of the present invention.
Figure 3:
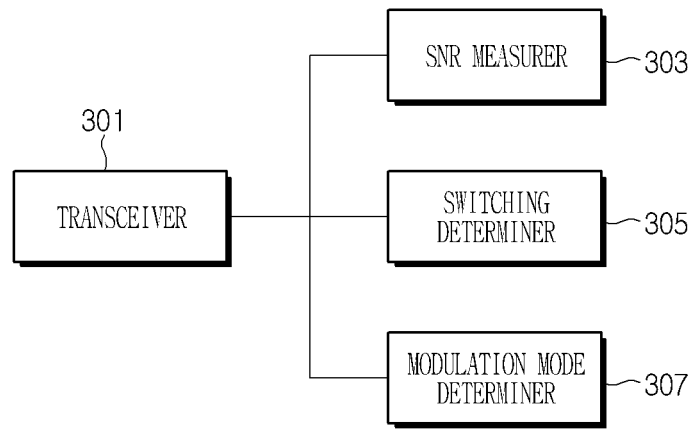
FIG. 3 is a block diagram of a receiver according to an exemplary embodiment of the present invention.

FIG. 1 is a block diagram of an apparatus for transmitting and receiving a signal according to an exemplary embodiment of the present invention, and FIGS. 2 and 3 are block diagrams of a transmitter and a receiver according to an exemplary embodiment of the present invention, respectively.

Referring to FIGS. 1 to 3, the apparatus for transmitting and receiving a signal according to an exemplary embodiment of the present invention includes a transmitter 101 including a plurality of antennas 103-1, 103-2, . . . , and 103-L, and a receiver 105 including at least one antenna 107 and a comparator 106.

As illustrated in FIG. 2, the transmitter 101 includes a modulator 201, a switching controller 203 and a transceiver 205. As illustrated in FIG. 3, the receiver 105 includes a transceiver 301, a Signal-to-Noise Ratio (SNR) measurer 303, a switching determiner 305 and a modulation mode determiner 307. The SNR measurer 303 and the switching determiner 305 may correspond to the comparator 106 of FIG. 1.

A signal to be transmitted from the transmitter 101 to the receiver 105 is modulated by the modulator 201 and transmitted through one of the antennas 103-1, 103-2, . . . , and 103-L. The transmitted signal is input to the receiver 105 through the receiving antenna 107, after passing through a wireless channel. Here, the antennas 103-1, 103-2, . . . , and 103-L preferably have directivities. When the transmitter 101 has the antennas 103 numbering L, respective antennas have a directivity of $$\frac{2\pi}{L}.$$

When the transmitting antennas 103-1, 103-2, . . . , and 103-L have the specific directivity, it is possible to obtain as much power gain as the degree of the directivity in comparison with an omni-directional antenna. In other words, the power gain of the transmitter 101 may increase as much as multiplied by L.

The transmitter 101 has one Radio Frequency (RF) chain and thus uses one of the antennas 103-1, 103-2, . . . , and 103-L to transmit a transmission signal to the receiver. When the transmitter 101 transmits a signal to the receiver 105 for the first time, the transmitter 101 may select a random antenna from the antennas 103-1, 103-2, . . . , and 103-L and transmit the signal to the receiver 105 through the selected antenna. When the transmitter 101 receives an antenna switching indicator from the receiver 105 indicating to switch a current antenna, it switches from the current transmitting antenna to another antenna.

The modulator 201 performs an adaptive modulation scheme according to a wireless channel environment. Here, M-ary Quadrature Amplitude Modulation (M-QAM) is applied as the modulation scheme according to the wireless channel environment. According to the present invention, a modulation mode is determined by the modulation mode determiner 307 of the receiver 105 and is fed back to the transmitter 101, and then an adaptive modulation scheme is performed according to the determined modulation mode.

The SNR measurer 303 of the receiver 105 measures an SNR of a signal received through the receiving antenna 107. Then, the switching determiner 305 compares the measured SNR with a specific reference value, and determines to switch a current transmitting antenna of the transmitter 101 when the SNR is less than the reference value. When it is determined to switch the current transmitting antenna of the transmitter 101, the receiver 105 feeds back an antenna switching indicator to the transmitter 101, and the transmitter 101 switches the current transmitting antenna through the switching controller 203.

Here, the antenna switching indicator may be fed back only when the switching determiner 305 determines to switch a transmitting antenna. In addition, even when it is determined not to switch a transmitting antenna, the antenna switching indicator having a different value indicating not to switch the transmitting antenna may be fed back to the transmitter 101. The antenna switching indicator can be represented by one bit. For example, "1" may indicate to switch a transmitting antenna, and "0" may indicate not to switch a transmitting antenna. Meanwhile, the switching indicator and a modulation mode index to be described below may be fed back together or separately from the receiver 105 to the transmitter 101.

The modulation mode determiner 307 of the receiver 105 determines a modulation mode using the measured SNR. In particular, when SNRs are classified into N regions, the SNR measured by the SNR measurer 303 belongs to one of the N regions. More specifically, when the measured SNR belongs to an n-th region ($\gamma_{Tn}, \gamma_{Tn+1}$) among the N regions, the receiver 105 feeds back a modulation mode index of n to the transmitter 101, and the transmitter 101 performs $2^n$-QAM. In other words, when the SNR is less than $\gamma_{Tn+1}$ and greater than or equal to $\gamma_{Tn}$, the receiver 105 determines $2^n$-QAM as a modulation mode. Here, n has a value of 2 to N, and a constellation size is denoted by $2^n = M$.

Respective threshold values $\gamma_{Tn}$ of the N regions vary according to a target Bit Error Rate (BER). In the cases of the target BER being 1%, 0.1% and 0.01%, threshold values by which respective modulation levels are classified are shown in Table 1 below.

TABLE 1

| n | $\gamma_{Tn}$ [dB] for $BER_0 = 10^{-2}$ | $\gamma_{Tn}$ [dB] for $BER_0 = 10^{-3}$ | $\gamma_{Tn}$ [dB] for $BER_0 = 10^{-4}$ |
|---|---|---|---|
| 2 | 7.33 | 9.64 | 11.35 |
| 3 | 11.84 | 13.32 | 16.07 |
| 4 | 13.90 | 16.63 | 18.23 |
| 5 | 17.83 | 19.79 | 22.29 |
| 6 | 19.73 | 22.86 | 24.30 |
| 7 | 23.85 | 25.91 | 28.24 |
| 8 | 25.43 | 28.94 | 30.23 |

The receiver 105 feeds back an index indicating the determined modulation mode to the transmitter 101. Here, a short guard period may be periodically inserted in the signal in consideration of a time for the receiver 105 to measure an SNR of a received signal and determine whether or not to switch a current antenna and a modulation mode.

Meanwhile, the specific reference value may be determined to be the minimum modulation size in order to limit the number of antenna switching to the minimum while satisfying the required minimum transmission rate. Also, in order to maximize frequency efficiency, the specific reference value may be determined to be the maximum modulation size. The reference value may be determined in the transmitter 101 and transmitted to the receiver 105, or determined in the receiver 105.

Figure 4:
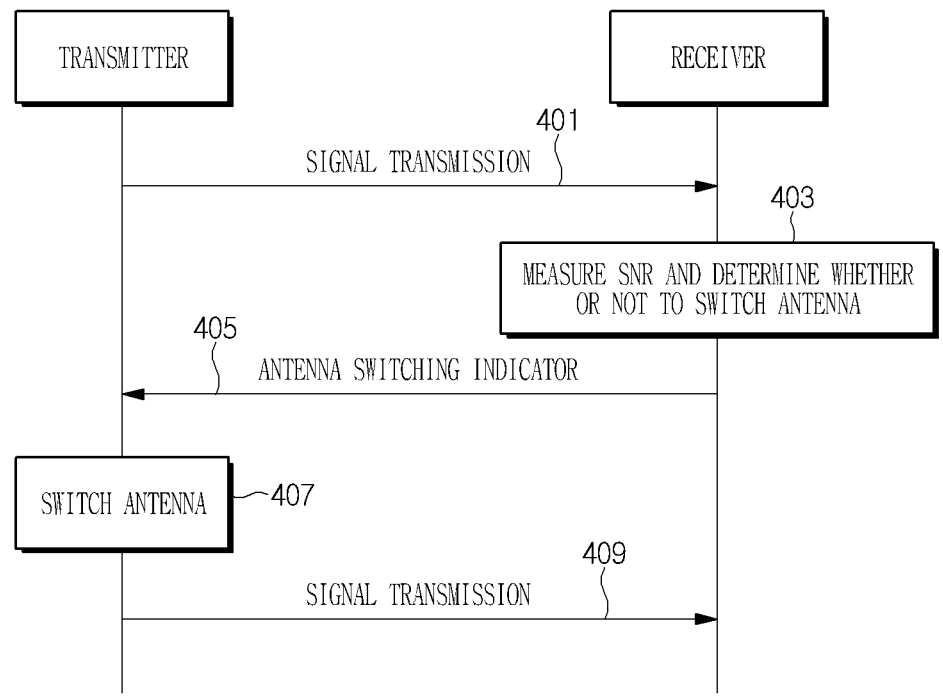
FIG. 4 is a signal flowchart between a transmitter and a receiver according to an exemplary embodiment of the present invention.

FIG. 4 is a signal flowchart between a transmitter and a receiver according to an exemplary embodiment of the present invention.

Referring to FIG. 4, the transmitter modulates a signal to be transmitted and then transmits the modulated signal to the receiver (step 401). Here, the transmitter transmits the signal through one of a plurality of antennas. When the transmitter performs first communication with the receiver, the transmitter may transmit information indicating that the signal is transmitted using the multiple antennas, that is, information indicating a multi-transmitter-antenna mode to the receiver. Here, the multi-transmitter-antenna mode information may include information on a reference value for the receiver to determine whether or not to switch the transmitting antenna and information on the number of the transmitting antennas.

Subsequently, the receiver measures an SNR of the received signal and compares the SNR with the reference value to determine whether or not to switch the transmitting antenna (step 403). More specifically, the receiver determines not to switch the transmitting antenna when the measured SNR is greater than or equal to the reference value, and determines to switch the transmitting antenna when the measured SNR is less than the reference value. As described above, the reference value may be determined in the transmitter and transmitted to the receiver, be predetermined in the receiver, or adaptively vary.

The receiver transmits an antenna switching indicator to the transmitter according to whether or not to switch the transmitting antenna, which is determined in step 403 (step 405). The antenna switching indicator may be transmitted only when it is determined to switch the transmitting antenna. After receiving the antenna switching indicator, the transmitter switches from the current transmitting antenna to another antenna when the antenna switching indicator indicates to switch the transmitting antenna (step 407). Subsequently, the transmitter transmits a signal to the receiver through the switched transmitting antenna (step 409).

Meanwhile, the receiver may transmit a modulation mode index corresponding to the SNR measured in step 403 to the transmitter. Here, the receiver transmits the modulation mode index using a channel which is the same as or different from the switching indicator. Subsequently, the transmitter transmits the signal modulated according to a modulation scheme corresponding to the determined modulation mode to the receiver in step 409.

When the receiver determines to continuously switch the transmitting antenna as many times as the number of the antennas, and SNRs of all the transmitting antenna paths are less than $\gamma_{T2}$, the receiver may operate according to two options below in a process of transmitting a modulation mode index. The receiver may request the transmitter to transmit a signal using the lowest modulation mode in violation of a target BER, i.e., a Quadrature Phase Shift Keying (QPSK) modulation scheme (option 1). Otherwise, the receiver may request the transmitter to store data in a buffer and wait for a better channel environment until a next guard period (option 2).

According to what the reference value is, a minimum estimation scheme or bandwidth-efficient scheme may be used.

First, the minimum estimation scheme will be described below.

The minimum estimation scheme is intended to minimize the number of times that a transmitter switches an antenna. Here, a receiver sets the lowest reference value $\gamma_{T2}$ as a reference value for antenna switching. When an SNR of a current antenna is greater than or equal to the reference value $\gamma_{T2}$, the receiver compares the SNR of the current antenna path with threshold values for determining a modulation mode. When the SNR is less than $\gamma_{Tn+1}$ and greater than or equal to $\gamma_{Tn}$, the receiver determines n as a modulation mode. Here, the modulation scheme becomes $2^n$-QAM. The receiver feeds back the determined modulation mode to the transmitter, and the transmitter modulates a subsequent data burst according to the fed-back modulation scheme.

Meanwhile, when the SNR of the current antenna is less than $\gamma_{T2}$, the transmitter may be instructed to switch all transmitting antennas, that is, SNRs of all the transmitting antennas are less than $\gamma_{T2}$. In this case, the receiver may perform one of two options below. The receiver may request the transmitter to transmit a signal using the lowest modulation mode in violation of a target BER, i.e., the QPSK modulation scheme (option 1). Otherwise, the receiver may request the transmitter to store data in a buffer and wait for a better channel environment until a next guard period (option 2). According to option 1, the receiver may receive a signal via the latest antenna path, or feed back the best antenna path to the transmitter and receive a signal via the best antenna path.

Next, the bandwidth-efficient scheme will be described below.

The bandwidth-efficient scheme is intended to maximize frequency efficiency. To increase frequency efficiency, the highest modulation mode is needed. More specifically, the receiver determines the highest value $\gamma_{TN}$ as a reference value. When an SNR of a current antenna path is greater than or equal to the reference value $\gamma_{TN}$, the receiver stops antenna switching and requests the transmitter to modulate a subsequent data burst using $2^N$-QAM and transmit the modulated data burst. When the SNR of the current antenna path becomes less than the reference value $\gamma_{TN}$, the receiver feeds back a signal indicating to search for and switch to an antenna path having a greater SNR than the reference value $\gamma_{TN}$. When SNRs of all antennas are less than the reference value $\gamma_{TN}$, the receiver may determine a modulation mode according to an SNR of the latest antenna path and feed back the determined modulation mode to the transmitter. Otherwise, the receiver may compare the SNRs of all antenna paths to determine the highest SNR, and determine transmitting antenna information and a modulation mode corresponding to the determined SNR and feed back the determined transmitting antenna information and modulation mode to the transmitter.

Meanwhile, in the worst case, that is, when the SNRs of all the antenna paths are less than $\gamma_{T2}$, the bandwidth-efficient scheme may operate according to one of two options like the minimum estimation scheme. The receiver may request the transmitter to transmit a signal using the lowest modulation mode in violation of a target BER, i.e., the QPSK modulation scheme (option 1). Otherwise, the receiver may request the transmitter to store data in a buffer and wait for a better channel environment until a next guard period (option 2).

Figure 5:
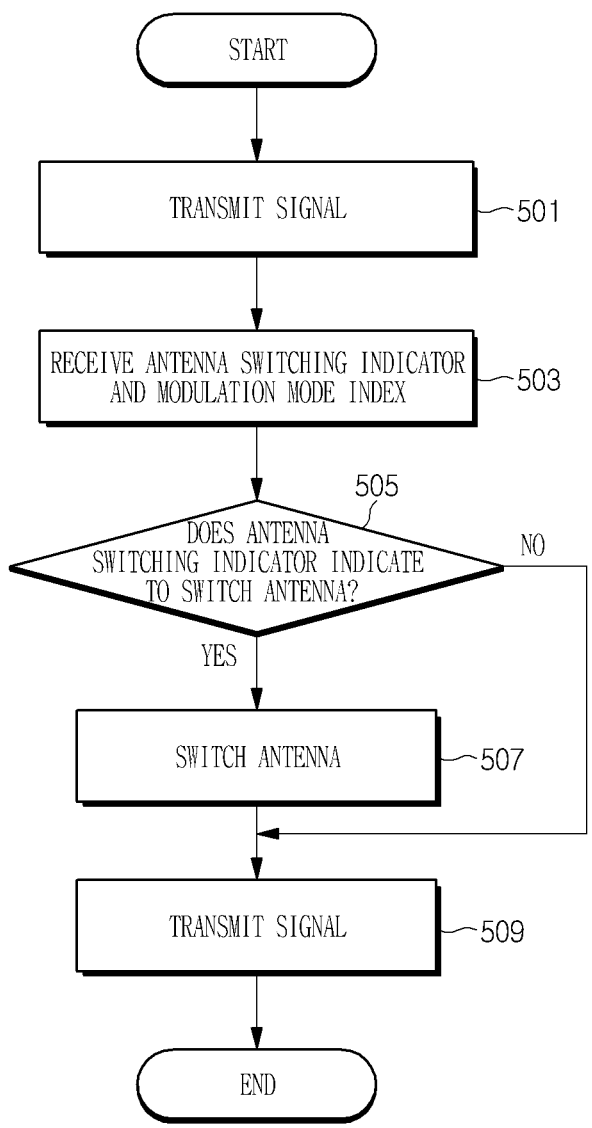
FIG. 5 is a flowchart showing a signal transmitting and receiving process at a transmitter according to an exemplary embodiment of the present invention.

FIG. 5 is a flowchart showing a signal transmitting and receiving process at a transmitter according to an exemplary embodiment of the present invention.

Referring to FIG. 5, the transmitter modulates a signal to be transmitted to a receiver and transmits the modulated signal to the receiver (step 501). Here, the transmitter may transmit multi-transmitter-antenna mode information indicating that multiple antennas are used to the receiver. The multi-transmitter-antenna mode information may include information on the number of transmitting antennas and information on a reference value for determining whether or not to switch a transmitting antenna. Subsequently, the transmitter receives an antenna switching indicator and a modulation mode index from the receiver (step 503). Here, the antenna switching indicator and the modulation mode index may be received through the same channel or different channels.

The transmitter determines whether the antenna switching indicator indicates to switch the transmitting antenna or not (step 505). When it is determined that the antenna switching indicator indicates to switch the transmitting antenna, the process proceeds to step 507, and the transmitter switches the current transmitting antenna to another antenna. On the other hand, when it is determined that the antenna switching indicator does not indicate to switch the transmitting antenna, the process proceeds to step 509. In step 509, the transmitter modulates a signal according to a modulation mode corresponding to the received modulation mode index and then transmits the modulated signal to the receiver.

Figure 6:
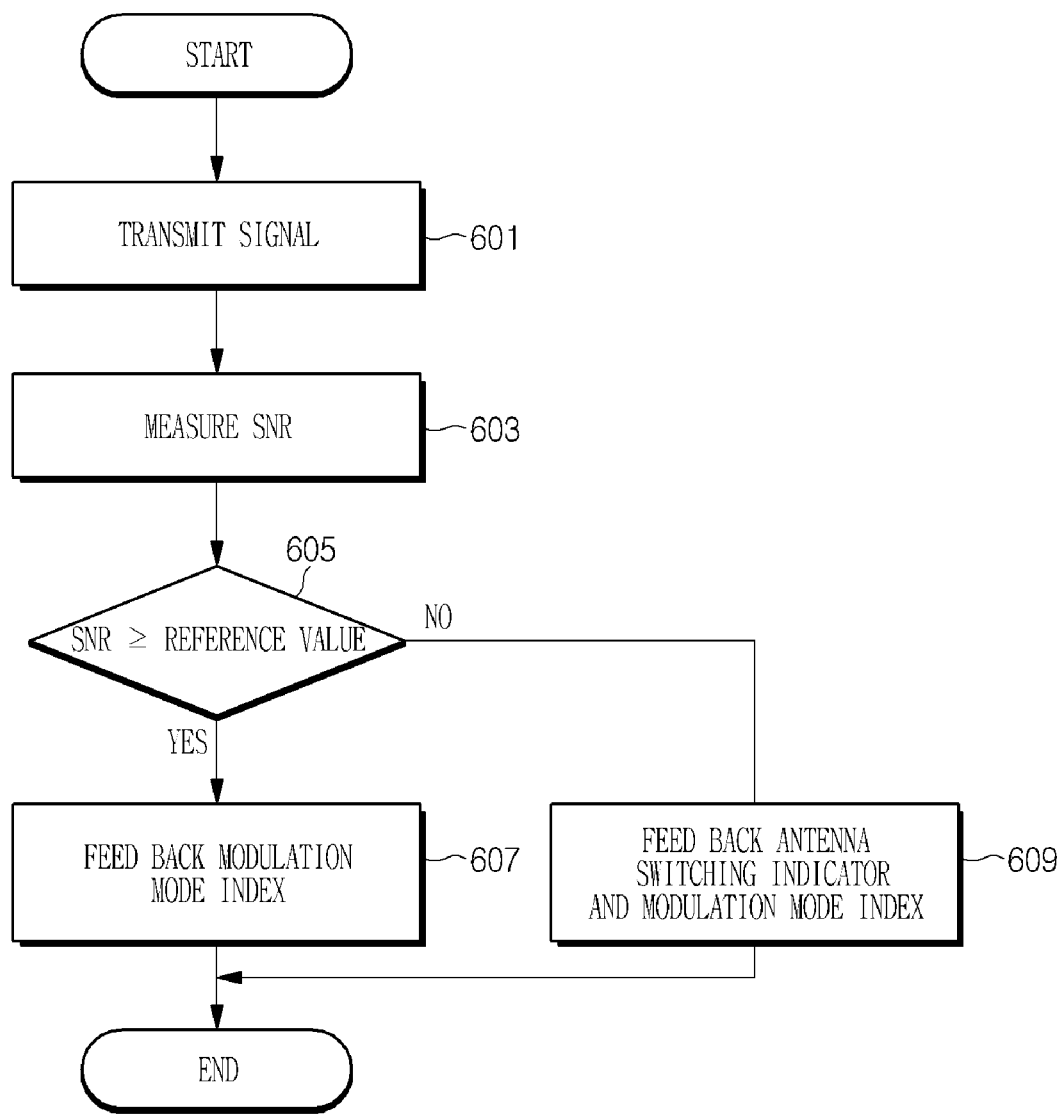
FIG. 6 is a flowchart showing a signal transmitting and receiving process at a receiver according to an exemplary embodiment of the present invention.

FIG. 6 is a flowchart showing a signal transmitting and receiving process at a receiver according to an exemplary embodiment of the present invention.

Referring to FIG. 6, the receiver receives a signal transmitted from a transmitter (step 601). The receiver measures an SNR of the received signal (step 603).

Subsequently, the receiver compares the measured SNR with a specific reference value (step 605). Here, the reference value may be transmitted from the transmitter, be determined in the receiver itself, or adaptively vary according to the type of communication with the transmitter.

When it is determined in step 605 that the SNR is greater than or equal to the reference value, the process proceeds to step 607. On the other hand, when it is determined the SNR is less than the reference value, the process proceeds to step 609.

In step 607, the receiver compares the SNR with threshold values $\gamma_{T3}, \gamma_{T4}, \ldots, \gamma_{Tn}$ for determining a modulation mode. When the SNR is less than $\gamma_{Tn+1}$ and greater than or equal to $\gamma_{Tn}$, the receiver determines n as a modulation mode and feeds back the modulation mode to the transmitter.

In step 609, the receiver feeds back an antenna switching indicator to switch a transmitting antenna and a modulation mode index to the transmitter. Here, the modulation mode index is determined as described in step 607.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of transmitting and receiving a signal at a transmitter including a plurality of antennas used for millimeter waves, the method comprising:
   transmitting, to a receiver, information indicating a threshold value for antenna switching;
   transmitting, to the receiver, a first signal through a transmitting antenna which is one of the plurality of antennas used for the millimeter waves;
   receiving, from the receiver, an antenna switching indicator requesting to switch the transmitting antenna;
   switching the transmitting antenna according to the antenna switching indicator; and
   transmitting a signal to the receiver through a switched antenna,
   wherein the antenna switching indicator is received when a Signal-to-Noise Ratio (SNR) of the first signal is lower than the threshold value, and
   the transmitter is applied to a wireless personal area network (WPAN) system based on the millimeter waves.

2. The method of claim 1, wherein the plurality of antennas have different directivities from one another.

3. The method of claim 1, further comprising:
   receiving a modulation mode index from the receiver,
   wherein the transmitter modulates the second signal according to a modulation mode corresponding to the modulation mode index and transmits the modulated signal.

4. The method of claim 3, wherein the receiver compares the Signal-to-Noise Ratio (SNR) of the first signal with the threshold value $\gamma_{Tn}$ (n=N, N−1, . . . , 2) for determining a modulation mode, and determines n as the modulation mode index when the SNR is less than $\gamma_{Tn+1}$ and greater than or equal to $\gamma_{Tn}$.

5. The method of claim 1, further comprising:
   transmitting, to the receiver, information on a number of the plurality of antennas.

6. The method of claim 1, further comprising:
   receiving a request to store subsequent signals in a buffer and wait until a next guard period when a Signal-to-Noise Ratio (SNR) of all of the plurality of antennas are lower than the threshold value.

7. A method of transmitting and receiving a signal at a receiver connected with a transmitter including a plurality of antennas used for millimeter waves through a wireless channel, the method comprising:
   receiving, from the transmitter, information indicating a reference value for antenna switching;
   receiving, from the transmitter, a first signal through a transmission antenna which is one of the plurality of antennas used for the millimeter waves;
   measuring a Signal-to-Noise Ratio (SNR) of the first signal;
   comparing the measured SNR with the threshold value;
   transmitting, to the transmitter, an antenna switching indicator requesting to switch the transmitting antenna when the measured SNR is lower than the threshold value as a result of the comparison; and
   receiving a second signal transmitted from a switched antenna of the transmitter,
   wherein the receiver is applied to a wireless personal area network (WPAN) system based on the millimeter waves.

8. The method of claim 7, further comprising:
   determining a modulation mode corresponding to the measured SNR; and
   transmitting a modulation mode index according to the determined modulation mode to the transmitter,
   wherein the receiver compares the measured SNR with the threshold value $\gamma_{Tn}$ (n=N, N−1, . . . , 2) for determining a modulation mode and determines n as the modulation mode.

9. The method of claim 7, further comprising:
   receiving at least one of information on a number of the plurality of antennas.

10. The method of claim 9, wherein when the receiver continuously transmits as many antenna switching indicators as the number of the plurality of antennas and SNRs of all the transmitting antennas are lower than a lowest threshold value $\gamma_{T2}$, the receiver requests the transmitter to transmit a subsequent signal using a Quadrature Phase Shift Keying (QPSK) modulation scheme.

11. The method of claim 9, wherein when the receiver continuously transmits as many antenna switching indicators as the number of the plurality of millimeter wave antennas and SNRs of all the transmitting antennas are lower than the threshold value $\gamma_{T2}$, the receiver transmits to the transmitter a request to store subsequent signals in a buffer and wait for a next guard period.

12. A transmitter for transmitting a signal in a wireless personal network (WPAN) system based on millimeter waves, the apparatus comprising:
   a controller;
   a transceiver; and
   a plurality of antennas used for the millimeter waves,
   wherein the transmitter is configured to:
   transmit, to a receiver using the transceiver, information indicating a threshold value for antenna switching;
   transmit, to the receiver using the transceiver, a first signal through a transmitting antenna which is one of the plurality of antennas;
   receive, from the receiver using the transceiver, an antenna switching indicator requesting to switch the transmitting antenna;
   switch the transmitting antenna according to the antenna switching indicator by using the controller; and
   transmit a second signal to the receiver through a switched antenna, wherein the antenna switching indicator is received when a Signal-to-Noise Ratio (SNR) of the first signal is lower than the threshold value.

13. The transmitter of claim 12, wherein the apparatus further configured to transmit, to the receiver by using the transceiver, information on a number of the plurality of antennas.

14. The transmitter of claim 13, wherein the plurality of antennas have different directivities from one another.

15. A receiver for receiving a signal from a transmitter including a plurality of antennas used for millimeter waves in a wireless personal network (WPAN) system, the receiver comprising:
a controller;
a transceiver; and
wherein the receiver is configured to:
receive, from a transmitter by using the transceiver, information indicating a threshold value for antenna switching;
receive, from the transmitter by using the transceiver, a first signal through a transmission antenna which is one of the plurality antennas used for millimeter waves;
measure, by using the controller, a Signal-to-Noise Ratio (SNR) of the first signal;
compare, by using the controller, the measured SNR with the threshold value;
transmit, to the transmitter by using the transceiver, an antenna switching indicator requesting to switch the transmitting antenna when the measured SNR is lower than the threshold value as a result of the comparison; and
receive a second signal transmitted from a switched antenna of the transmitter by using the transceiver,
wherein the receiver is applied to the WPAN system based on millimeter waves.

16. The receiver of claim 15, wherein the receiver is further configured to receive information on a number of the plurality of antennas.

17. The receiver of claim 16, wherein the receiver is configured to:
determine a modulation mode corresponding to the measured SNR by using the controller; and
transmit a modulation mode index according to the determined modulation mode to the transmitter by using the transceiver,
wherein the receiver compares the measured SNR with the threshold value (n=N, N−1, . . . , 2) for determining a modulation mode and determines n as the modulation mode.

* * * * *